No. 629,842. Patented Aug. 1, 1899.
P. H. YAWMAN.
FISHING REEL.
(Application filed Apr. 7, 1898.)
(No Model.) 2 Sheets—Sheet 2.
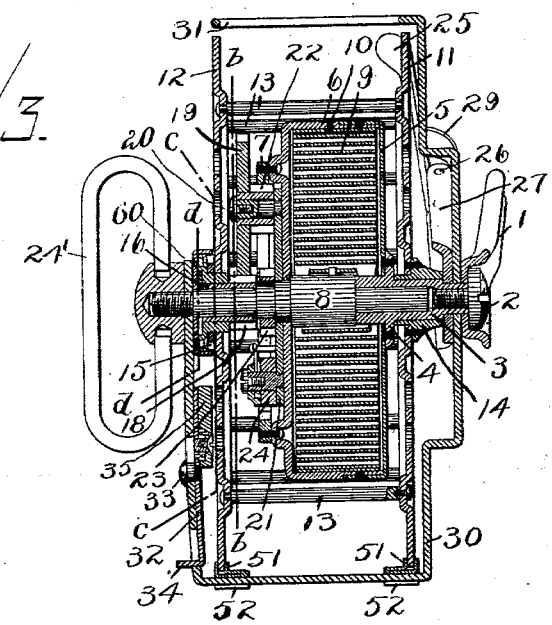
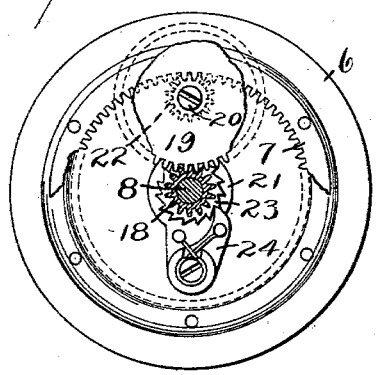
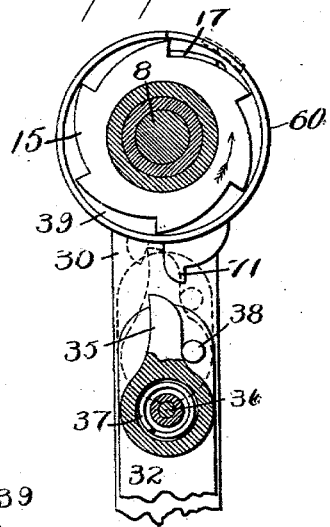
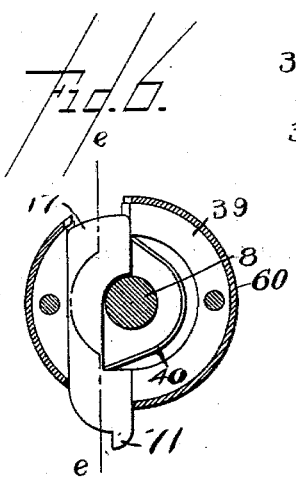
Witnesses.
Chas. F. Logan.
Sewillard Rich.
Inventor.
Philip H. Yawman
by Church & Church
his Attorneys

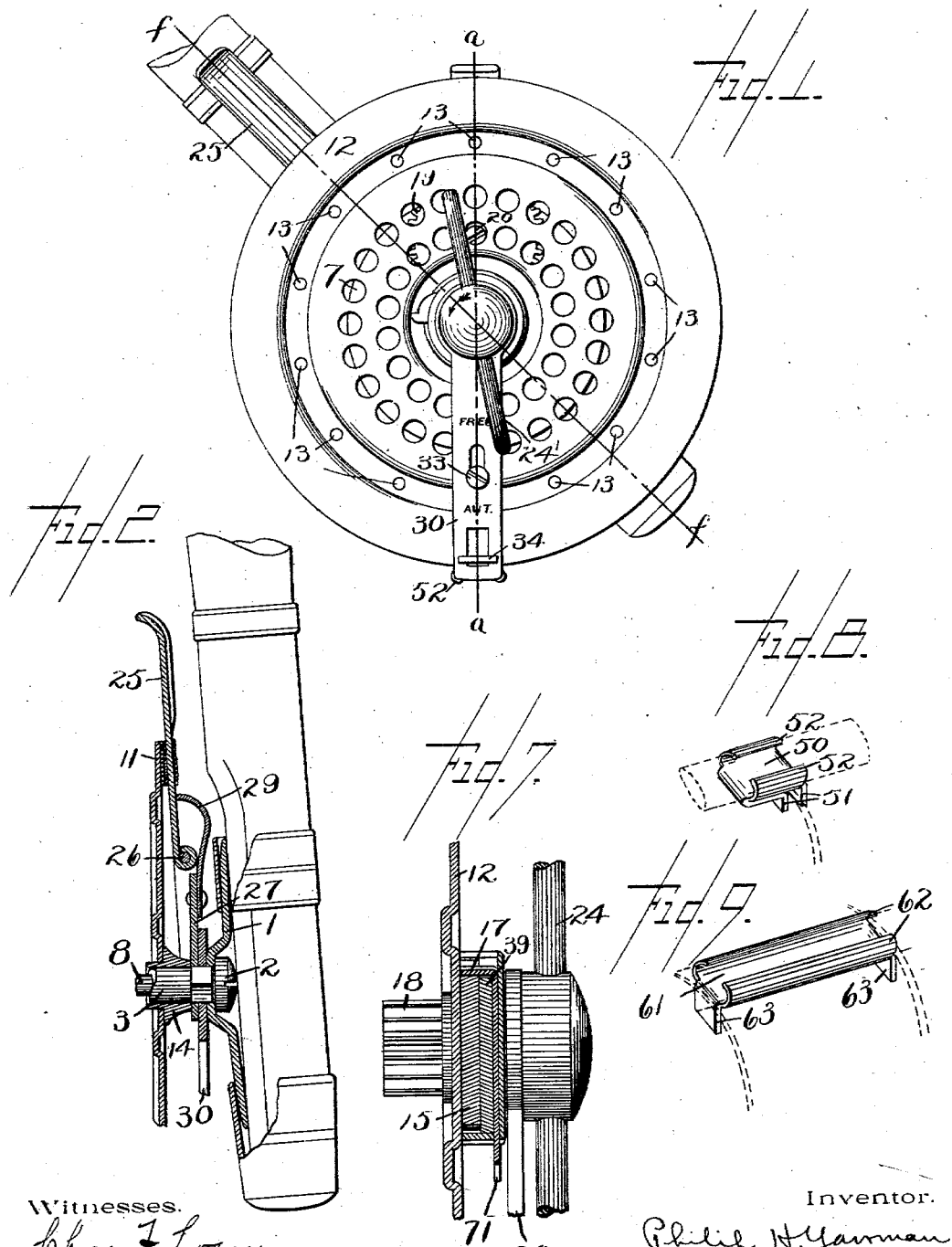

UNITED STATES PATENT OFFICE.

PHILIP H. YAWMAN, OF ROCHESTER, NEW YORK, ASSIGNOR TO THE YAWMAN & ERBE MANUFACTURING COMPANY, OF SAME PLACE.

FISHING-REEL.

SPECIFICATION forming part of Letters Patent No. 629,842, dated August 1, 1899.

Application filed April 7, 1898. Serial No. 676,779. (No model.)

*To all whom it may concern:*

Be it known that I, PHILIP H. YAWMAN, of Rochester, in the county of Monroe and State of New York, have invented certain new and useful Improvements in Fishing-Reels; and I do hereby declare the following to be a full, clear, and exact description of the same, reference being had to the accompanying drawings, forming a part of this specification, and to the reference-numerals marked thereon.

My present invention relates generally to automatic fishing-reels of the class shown in my prior patent, No. 454,319, dated June 16, 1891—that is to say, those employing a reel or drum operated by means of a spring to take up the line and controlled by the operation of a brake; and it has for its object to improve the construction and operation of such reels, whereby the spring may be wound up independently of the withdrawal of the line and also the reel may be disconnected from the winding-spring and operate freely in such manner that the device may be used for fly-casting; and to these and other ends it consists in certain improvements hereinafter described, the novel features being pointed out particularly in the claims at the end of this specification.

In the drawings, Figure 1 represents a side elevation of a reel constructed in accordance with my invention applied to the end of a fishing-rod; Fig. 2, a sectional view on the line *f f*, showing merely the supporting or base plate and the brake; Fig. 3, a vertical sectional view on the line *a a* of Fig. 1; Fig. 4, a sectional view on the line *b b* of Fig. 3; Fig. 5, a sectional view on the line *c c* of Fig. 3; Fig. 6, a sectional view on the line *d d* of Fig. 3; Fig. 7, a sectional view on the line *e e* of Fig. 6; Fig. 8, a view of a detail; Fig. 9, a view of a modification.

Similar reference-numerals in the different figures indicate similar parts.

Referring particularly to Figs. 2 and 3, 1 indicates the base or attaching plate, adapted to fit against the side of the rod and be secured by the usual rings or collars thereon, said plate being rigidly connected by a screw 2 to the angular end of a hollow supporting-stud 3, on which the operating parts of the reel are mounted. The stud 3 is provided with a flange 4, to which is rigidly secured one section 5 of a spring box or casing, the coöperating section 6 of said spring-box being rigidly, though removably, connected thereto and provided on its outer side with a toothed ring or internal gear 7, as shown particularly in Figs. 3 and 4, and the inner side of said stud 3 is made hollow to form a bearing for the reduced end of a rotary arbor 8, to which the inner end of the spring 9 is connected, the outer end of said spring being connected, as at 10, to the inner side of the spring-box section 6, so that the spring and arbor can be removed by separating the sections 5 and 6.

The reel or spool for receiving the line is composed of the annular end plates or heads 11 and 12, connected outside the spring-box by the cross-pins 13, on which latter the line is wound, the head or plate 11 having secured to it a sleeve or bushing 14, journaled loosely on the stud 3, and the head or plate 12 being provided on its outer side near the center with the ratchet-wheel 15, and is journaled on a sleeve 16, loose on the arbor. Mounted loosely upon the outer portion of the arbor 8 is the sleeve 16, extending through the central aperture of the plate 12 of the reel and having on its outer end a spring-operated radially-movable pawl 17, coöperating with the teeth of the ratchet 15 on the reel, this ratchet and pawl constituting a detachable connection and adapted when the pawl is thrown into engagement to connect said sleeve and reel, as will be presently described. The inner end of the sleeve is provided with the gear-teeth 18, meshing with a pinion 19, mounted upon a stud or screw 20, attached to an arm 21, loosely journaled on the arbor 8, and formed upon or connected to the gear 19 is a pinion 22, meshing with the teeth of the ring 7, secured to the spring-box, as shown in Figs. 3 and 4. Just outside of the arm 21 and secured rigidly to the arbor 8 is a ratchet-wheel 23, with which coöperates a spring-pawl 24, mounted on the arm 21, said pawl forming the connection between the arbor 8 and the mechanism for rotating the reel. The arbor 8 is provided at its outer end with an operating-handle 24', by which it may be rotated to place the spring 9 under tension.

25 indicates a brake-lever, such as shown in my prior patent, being pivoted at 26 upon a plate 27, rigidly secured on the stud 3 and operated toward the side of the reel by means of a spring 29, (shown in Fig. 2,) said brake being normally pressed in contact with the reel and holding it against the tension of the spring even when fully wound up, the operating end of said brake when the device is attached to a fishing-rod being in position to be operated upon by the little finger of the operator's hand to release the reel when desired.

In order to wind up the spring at any time, it is only necessary to turn the operating-handle 24' in the direction of the arrow in Fig. 1, which will cause the rotation of the arbor 8 independently of the operation of any of the other parts, and the ratchet-wheel 23 will turn with said arbor, the pawl yielding, so that the power of the spring is applied directly through said pawl to the arm 21 and from the latter, through the gear 19, which is rotated by contact of the pinion 22 with the stationary toothed ring 7, the gear 18, and the ratchet devices, to the reel, which latter is retained by the brake. It will thus be seen that the tension of the spring is not altogether dependent upon the unwinding of the line from the reel or the backward rotation of the latter; but the spring can be wound up behind the reel, so to say, thereby enabling a very long line to be wound upon the reel without the requirement of a special spring for the purpose. By the employment of the ratchet mechanism between the spring-operated arbor and the reel no damage can come to the spring, nor will it come unfastened if the line should be broken and the brake should be released from the reel, for when the spring had run down the inertia of the reel would simply cause the pawl 24 to slip over the teeth of the ratchet-wheel 23.

30 indicates a yoke, preferably formed of a single piece of material secured rigidly to the end of the stud 3, thence passing across the outer edge of the reel and having an aperture at its outer end, through which the arbor 8 passes loosely. This yoke is extended in an opposite and upward direction beyond the stud 3 and over the periphery of the reel and is slotted to form line-guide 31, as shown in Fig. 3. The other end of the yoke, which encircles the arbor 8, is provided on its inner side with a movable member in the form of a plate 32, held in position by a screw 33, passing through the slot in the arm of the yoke and having an operating-stud 34 on the outer side. Near the inner end of this plate is arranged a stop 35, which in the present instance is pivoted upon a screw 36, held by a spring 37 against the stop-pin 38, as shown particularly in Fig. 5. This stop 35 is arranged when the plate is moved inward to coöperate with the inclined projecting end of the sliding pawl 17, forming the connection between the reel and the spring-arbor. The pawl 17 is composed of a single plate of metal having one end bent at right angles and the other inclined and having a projection 71 and sliding in a recess formed in a plate 39, secured to the pinion 18 and operated in a direction to cause the engagement of the ratchet-wheel 15 by a spring 40, arranged in the recess in the plate 39 and coöperating with the said plate and also a shoulder on the pawl, and is covered by the cover-plate 60, having apertures, through one of which the inclined end of the pawl projects. When the plate 32 is moved inward toward the arbor, the end of the stop 35 will project in the path of the pawl 17, which is normally projected by its spring 40, and as the arbor and its connected parts tend to rotate in the direction of the arrow, Fig. 5, said stop will coöperate with the inclined end of the pawl, move it radially of the arbor, and cause the disengagement of the pinion 18 from the reel, and as this is the only connection between these parts the reel is then free to rotate in either direction, except as it is controlled by the brake operating against its periphery, and when this brake is removed by the operator's finger the line will unwind freely from the reel and the operator be enabled to make a cast, as in flyfishing. The feature of providing a freely-running reel which employs a brake that is entirely independent of the catch 17 is advantageous, as it enables the operator to control the reel at all times. As the tendency of the mainspring in the drum is to rotate the arbor in the direction of the arrow in Fig. 5, the pawl 17 will be held disconnected as long as the plate 32 is moved inward and the arbor prevented from being rotated by the spring, and the object of making the stop 35 capable of yielding away from the pin 38 is to prevent damage to the parts if said stop should be moved inward while the reel is being rotated in a direction opposite to that caused by the spring, as by the pull of a fish on the line; otherwise the parts would be broken by the sudden contact between the end of the pawl 17 and the stop 35.

In order that the line may be prevented from slipping between the faces of the reel and the parts of the yoke 30, I provide upon the cross-bar of the yoke clips 50, sliding loosely thereon and having ears 51, extending on opposite sides of the periphery of the reel heads or plates 11 and 12. These clips slide loosely on the cross-arm and are independent of each other, so that even should the reel be dropped and one of the plates or flanges 11 or 12 bent at the periphery the clip will follow the edge, sliding loosely on the cross-bar. These clips are preferably formed of a single piece of sheet metal formed with the inwardly-projecting ears 51, as shown, and also with the lugs or ears 52, extending at right angles thereto and bent over the sides of the cross-arm of the yoke, as shown particularly in Fig. 8. The clips shown could be used on other forms of reel, if desired, and it will be understood that the portion of the yoke extending over the flanged heads of the reel or drum is merely a supporting-arm so far as this portion of my invention is concerned.

It will be noted that there are two ratchet connections between the spring-operated arbor and the reel proper, one (composed of the parts 23 and 24) which permits the winding up of the spring to increase the tension and also to prevent breakage if the momentum of the reel carries it beyond the length of the spring, &c., and the other ratchet connection (embodying the pawl 17) between the reel and the gear operating it, whereby the reel may run free when desired for casting. The construction of the parts is such that they may be readily formed and assembled and the operations necessary and desirable for an automatic reel accomplished, and, further, all of the parts are arranged within the reel and are protected by the latter.

The clips sliding on the cross-bar of the yoke are stamped and formed from single blanks of metal and are desirable adjuncts to any form of reel or winding-drum, and I do not therefore desire to be confined to their use on the particular form of reel shown. If desired, a single loose plate 61 could be employed upon the cross-bar, having flanges 62, embracing said bar, and the lugs 63, extending inwardly and coöperating with the inner sides only of the reel-flanges, as shown in Fig. 9.

In this construction one of the lugs 63 performs practically the same function as the outer lug 51 (shown in Fig. 8) and constitutes a means for holding the lug 63 against the inner side of the flange on the drum, which function might be performed by other means, if desired.

I claim as my invention—

1. In a fishing-reel, the combination with a stationary support, a spring connected thereto at one end, a rotary arbor connected directly to the other end of the spring and adapted to be rotated thereby in one direction to rotate the drum, and an operating-handle for the arbor, of a reel or drum on which the line is wound, an automatic friction-brake operating on the drum, and gearing between the arbor and drum embodying a ratchet connection, whereby the spring may be wound by the rotation of the arbor, and the reel may rotate in the direction in which it is rotated by the spring, independently of the arbor.

2. In a fishing-reel, the combination with a stationary support adapted to be attached to a rod, a spring connected thereto at one end, a rotary arbor connected directly to the other end of the spring and adapted to be rotated thereby in one direction to rotate the drum, and an operating-handle for the arbor, of a line reel or drum, a friction-brake operating on the drum, gearing between the arbor and drum, and a pawl 24 and ratchet 23, and an independent detachable connection embodying wheel 15 and pawl 17 both arranged in said gearing between the arbor and drum.

3. In a reel, the combination with the stationary support, the rotatable drum or line-reel mounted thereon, a spring for actuating the reel, gearing arranged between the spring and reel and embodying a clutch connection, of a manually-operated controlling member movable on the stationary support and controlling the operation of the clutch, said member being independent of the spring-winding devices, a movable brake, and a spring normally holding it in contact with the drum to control its movement, said brake being capable of operation independently of the movement of the controlling member.

4. In a fishing-reel, the combination with a stationary support, a rotatable drum or line-reel mounted thereon, a spring for actuating the reel, gearing arranged between the spring and reel and embodying a clutch connection, and a manually-operated member having an arm thereon yielding in one direction only and coöperating with the clutch to control it, of a manually-controlled spring-operated friction-brake normally engaging the reel and capable of regulating its movement independently of the movable clutch-controlling member.

5. In a fishing-reel, the combination with a stationary support, a rotatable drum or line-reel mounted thereon, a spring for actuating the reel, gearing immediate the spring and reel, a clutch interposed in said gearing normally rotatable with the reel and embodying a movable catch or pawl, of a manually-operated movable member adapted to be moved into the path of the clutch-catch to disconnect the reel and spring, and a manually-controlled friction-brake operating on the reel and regulating its movement independently of the movable stop member.

6. In a fishing-reel, the combination with a stationary support, a rotatable arbor mounted thereon, a spring-casing connected to the support having the internal gear, the spring connected to the casing and gear, the arm connected to the arbor to rotate therewith, and the gear having the pinion thereon, of the sleeve loose on the arbor having the gear-teeth meshing with the gear having the pinion, the pawl 17 on the sleeve, the reel or drum having the ratchet-wheel with which the pawl coöperates, the movable stop-plate, the pivoted stop 35 thereon yielding in one direction only, and a friction-brake coöperating with the reel and operated independently of the stop-plate.

7. In a fishing-reel, the combination with the stud 3, the supporting-plate 1, the yoke, the brake-support 27, and the screw connecting them rigidly, of the rotatable arbor journaled in the stud 3, the spring connected to the arbor and stud, the reel or drum journaled on the stud and arbor and gearing connecting the arbor and reel, substantially as described.

8. In a fishing-reel, the combination with a stationary support, the arbor journaled thereon, the spring connecting the arbor and support, the reel journaled on the arbor and support, and gearing between said reel and the arbor, of the yoke connected to the support and in which the arbor is journaled, having the slotted extension over the reel forming a line-guide.

9. In a fishing-reel, the combination with the rotatable arbor 8, the spring, the sleeve loose on the arbor having the gear-teeth, and gearing between the arbor and sleeve, of the reel journaled on the sleeve outside the gear-teeth, the ratchet-wheel 15 on the outer side of the reel, the pawl 17 sliding in the sleeve and having the engaging end bent over and coöperating with the ratchet-wheel, and a manually-operated stop adapted to be moved to coöperate with the free end of the pawl to disengage it from the reel and arrest the sleeve, substantially as described.

10. The combination with the reel or drum having the flange at the periphery, of a stationary arm extending over said reel, and a clip sliding on said arm and having an ear coöperating with the inner side of the flange of the reel, and means for holding the ear in engagement with said flange, substantially as described.

11. The combination with the reel or drum having the flange at the periphery, of a stationary arm extending over the reel, a clip loose on the arm and having ears on opposite sides of the flange of the reel.

12. The combination with the reel or drum having the flange at the periphery, of a stationary arm extending over the reel, a clip sliding loosely on the arm and composed of a single piece of material formed with the ears embracing the arm and the ears at right angles thereto extending on opposite sides of the reel-flange, substantially as described.

13. The combination with the reel or drum having the flanges at the periphery, and a stationary arm extending over the reel, of two clips sliding loosely on the arm, and each having two ears passing on opposite sides of the flanges of the reel, substantially as described.

14. As an article of manufacture, a line-guide clip for use on reels and composed of a single plate of sheet metal formed with the ears 51, 51, and the ears 52, 52 extending at right angles thereto, substantially as described.

PHILIP H. YAWMAN.

Witnesses:
F. F. CHURCH,
G. WILLARD RICH.